United States Patent
Dias De Moraes E Silva et al.

(10) Patent No.: US 8,026,381 B2
(45) Date of Patent: Sep. 27, 2011

(54) CONTINUOUS PRODUCTION PROCESS FOR ETHYL ESTERS (BIODIESEL)

(76) Inventors: Reynaldo Dias De Moraes E Silva, Brasilia (BR); Karl Hampton, Washington, DC (US)

( * ) Notice: Subject to any disclaimer, the term of this patent is extended or adjusted under 35 U.S.C. 154(b) by 0 days.

(21) Appl. No.: 10/953,959

(22) Filed: Sep. 30, 2004

(65) Prior Publication Data

US 2006/0069274 A1  Mar. 30, 2006

(51) Int. Cl.
*C11B 1/00* (2006.01)

(52) U.S. Cl. ...................................................... 554/174
(58) Field of Classification Search ................ 554/160, 554/174
See application file for complete search history.

(56) References Cited

U.S. PATENT DOCUMENTS 5,968,792 A * 10/1999 Wenzel et al. ................ 435/134

* cited by examiner

*Primary Examiner* — Deborah D Carr
(74) *Attorney, Agent, or Firm* — Amelia B. Yarbrough

(57) ABSTRACT

This application refers to an industrial production process for ethyl esters (biodiesel).

2 Claims, No Drawings

CONTINUOUS PRODUCTION PROCESS FOR ETHYL ESTERS (BIODIESEL)

TECHNICAL FIELD

The DUOBIO process refers to a new process for splitting fatty acids from glycerides of any vegetable oil by hydrolysis at 60° C. and atmospheric pressure, using calcium and magnesium oxide (CaO.MgO) stones as the heterogeneous catalyst packed in the first column and the esterification these fatty acids with ethyl alcohol in the second cylinder also packed with calcium and magnesium oxide stones to produce ethyl monoesters (biodiesel) in two separate chemical reactions.

BACKGROUND OF THE INVENTION

Until now, the splitting of fatty acids by hydrolysis from glyceryl esters components of vegetable oils only occurred at a temperature of 250° C. and 49 kg/cm$^2$ of pressure (milled process) as an hydrolytic process to produce fatty acids as raw material to manufacture toilet soap from vegetable oil and animal fats, using only a one percent catalyst generally sodium or potash hydroxide (NaOH or KOH). FULLER wrote, "Over the years, fatty acids have been produced by four basic processes, i.e., saponification of fats followed by acidulation, the Twitchell Process, batch autoclave splitting, and continuous high-pressure, high temperature hydrolysis."

The production of methyl or ethyl esters is presently the result of transesterification (interesterification) whereby any vegetable oils are mixed with an excess of anhydrous alcohol in 1:6 ratio with one to two percent catalyst, generally sodium or potash hydroxide (NaOH or KOH) or sodium methoxide (NaOCH3), resulting in methyl or ethyl esters (biodiesel), glycerol (C3H5(OH)3) and alcohol dissolved by water process and recovered by azeothropic distillation and dehydration with benzol when ethanol is used.

The process of transesterification is well known throughout the world for some time. ALVIM quoted LOURY and MENSIER indicated that since 1945 many had already studied the production of methyl and ethyl esters of fatty acids through transesterification. The current process for the production of toilet soaps from fatty acids used by Procter & Gamble and Colgate Palmolive (milled process) patented between 1935 and 1940 used the splitting of fatty acids and glycerol with a continuous process of hydrolysis in insulated towers at high temperatures with superheated steam (240° C.) at high pressure (49 kg/cm$^2$) in a counter flow for two to three hours.

The production of fatty acids by splitting in Europe was processed in an autoclave where the mixture of oil and water was submitted to temperatures of 250° C. at 10 kg/cm$^2$ in a batch process for five to six hours. Another process known in the United States as the TWITCHELL process is no longer used. This is also a batch process whereby the oil and water is mixed with 0.1 to 0.2 percent of sulfuric acid for 36 to 48 hours and saturated steam at atmospheric pressure. This process was used primarily before the Second World War.

The chemical principle of transesterification is that the two reactions hydrolysis and esterification occur in a single step in a unique two-phase reaction. Many problems may arise from the transesterification process when using ethyl alcohol and not methyl alcohol, due to the tendency of the organic reaction to reverse in the second phase when carried out in the batch process. The yields drop to 60 percent of ethyl esters. Many researchers try to reduce the reverse tendency of this reaction by looking for catalysts other than sodium hydroxide or sodium methoxide. Some of these catalysts are expensive, somewhat rare or may need to be synthesized.

DISCLOSURE OF THE INVENTION

According to present research studies a new process is needed to avoid the reverse reaction, to reduce the high-energy costs, and to improve the slow speed of reaction. This DUOBIO process should provide a new splitting process based on the separation of the chemical reaction during transesterification into two steps instead of two phases; hydrolysis in the first step and esterification in the second step. This process avoids the reverse reaction tendency with ethanol in the transesterification process, using calcium and magnesium oxide (CaO.MgO) stones as a low-cost, abundant heterogeneous catalyst, that reduces the energy costs, and provides a high velocity of reaction.

The theoretical principle is based on the heterogeneous catalyst of calcium and magnesium oxide (CaO.Mg.O) stones, each ⅟15 the cylinder diameter, that presents the characteristics of ionic transitory exchange between the catalyst and the reactants. The specific sized CaO.MgO stones increase the surface contact area during emulsion of the water and oil with the catalyst. This intensified the ionic exchange and accelerates the hydrolysis process and the splitting of the glycerides into free fatty acids and glycerol which occurs in nearly 2.5 seconds for the process from the top of the 1.0 meter cylinder through the catalyst stones to the cylinder base. SWERN et al wrote, "If the catalyst is a solid, however, its behavior will depend not only upon its chemical composition, but also at a very large degree upon both the nature and extent of its surface."

The large contact surface area between the reactants and the low-cost heterogeneous catalyst of calcium and magnesium oxide (CaO.Mg.O) stones packed in a cylinder reduces drastically the hydrolysis process at 60° C. and atmospheric pressure, and results in the separation of fatty acids and glycerol at the cylinder base. The second esterification reaction results in a feasible low-cost biodiesel production process using ethyl alcohol which is low cost, and results in high yields and is scalable to any production size.

The chemical reaction of the process for splitting through hydrolysis is the following:

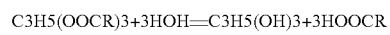

$$C3H5(OOCR)3 + 3HOH = C3H5(OH)3 + 3HOOCR$$

The differences between this process and other transesterification processes are:
a. This process avoids the reverse reaction with ethanol, common in organic chemistry, by the continued separation of fatty acids from glycerol and ethylic ester from the water process.
b. This process allows a continuous flow through two packed columns using a low-cost abundant catalyst.
c. This process splits the fatty acids through hydrolysis at low temperature and pressure.
d. The packed columns allow the quadratic projection of capacity without affecting the chemical reactions and resulting products.
e. This process makes it feasible to design a high-capacity industrial plant because there is no need for scale-up of the batch process.
f. This process uses hydrated ethyl alcohol which reduces the costs of production because there is no need for rectification and dehydration of recovered excess alcohol if it is anhydrous.
g. The final product of this process is ethyl ester dissolved in ethanol and water process, and not an ethanol and water solution, allowing an easier separation by higher difference of specific gravities.

h. The yields obtained are much higher than in transesterification (around 92 to 96%) because of the perfect separation through hydrolysis and near stoichiometric yields.

i. This process works for any vegetable oil, including the Castor Oil, that is saponified through the transesterification process with sodium hydroxide or methoxide and potash hydroxide and ethanol.

j. This process is more economical and less costly than any other presently known process for splitting fatty acids and glycerol from vegetable oils and animal fats, and fixed investments for the same capacity production is much lower than in the presently used processes.

REFERENCE CITED

Swern, Daniel et al in "Bailey's Industrial Oil and Fat Products", John Wiley & Sons, Inc. USA, 1964, p. 797

Fuller, Glenn in "Animal and vegetable Oils, Fats and Waxes"—Riegel's Handbook of Industrial Chemistry Edited by James Kent, $8^{th}$ Edition, 1982, p. 439, Alvim, P. de T. and Alvim, R. in "Sources d'energie d'origine végétale: hydrates de carbone, huiles et hydrocarbure", OLEAGINEUX, Octobre 1979, p. 465

Loury, M. M., Un nouveau carburant colonial possible, l'huile de palme méthanolyseé, France Energétique, Nos. 11-12, 1945, p. 332-334

Mensier, P. H. in "La production de carburants à partir des oleagineux—France Energétique, Nos. 9-10, 1945, p. 277-279 and L'emploi des huiles vegétales comme combustible dans les moteurs. Oleagineux, no. 2, p. 69-74

Clark, S. J. et al., "Methyl and Ethyl Soybean Esters as Renewable Fuels for Diesel Engines," JAOCS, vol. 61, No. 10(1984), pp. 1632-1638.

The invention claimed is:

1. The DUOBIO process comprising the use of hydrolysis to split the mono-, bi- and triglycerides of vegetable oils to produce fatty acids and glycerol by passing them through a column packed with a heterogeneous catalyst consisting essentially of calcium oxide and magnesium oxide (CaO and MgO) stones, each ⅕ the column diameter at a reaction temperature of 60 degrees centigrade and at atmospheric pressure giving yields of about 96 percent; the process further comprises the esterification of the free fatty acids with hydrated ethanol in a second column packed with the said heterogeneous catalyst.

2. The process of claim 1, wherein the hydrolysis process itself occurs in 2.5 seconds 1.0 meters from the top of the cylinder.

\* \* \* \* \*